United States Patent
Chickering et al.

(10) Patent No.: US 10,050,804 B2
(45) Date of Patent: Aug. 14, 2018

(54) LOOP-FREE FABRIC UTILIZING DISTRIBUTED ADDRESS AND PORT TABLES

(71) Applicant: Pluribus Networks, Inc., Palo Alto, CA (US)

(72) Inventors: Roger Chickering, Sacramento, CA (US); Sunay Tripathi, Los Altos, CA (US)

(73) Assignee: Pluribus Networks, Inc., Palo Alto, CA (US)

( * ) Notice: Subject to any disclaimer, the term of this patent is extended or adjusted under 35 U.S.C. 154(b) by 162 days.

(21) Appl. No.: 15/170,822

(22) Filed: Jun. 1, 2016

(65) Prior Publication Data

US 2017/0353328 A1    Dec. 7, 2017

(51) Int. Cl.
*H04L 12/437*  (2006.01)
*H04L 12/26*   (2006.01)
*H04L 29/08*   (2006.01)
*H04L 12/741*  (2013.01)

(52) U.S. Cl.
CPC ............ *H04L 12/437* (2013.01); *H04L 43/16* (2013.01); *H04L 45/745* (2013.01); *H04L 69/324* (2013.01)

(58) Field of Classification Search
CPC ...... H04L 12/437; H04L 43/16; H04L 45/745
See application file for complete search history.

(56) References Cited

U.S. PATENT DOCUMENTS

| | | | | |
|---|---|---|---|---|
| 8,737,198 B1* | 5/2014 | Holness | .............. | H04L 12/437 370/222 |
| 9,137,137 B2* | 9/2015 | Chen | .................... | H04L 43/10 |
| 9,698,994 B2* | 7/2017 | Pani | .................... | H04L 12/18 |
| 2002/0095399 A1* | 7/2002 | Devine | ............... | G06F 17/3089 |
| 2007/0171814 A1* | 7/2007 | Florit | .................. | H04L 12/437 370/216 |
| 2010/0179940 A1* | 7/2010 | Gilder | .............. | G06F 17/30566 707/622 |
| 2013/0163596 A1* | 6/2013 | Zhang | .................. | H04L 45/18 370/392 |
| 2013/0279322 A1* | 10/2013 | Vavilala | ............. | H04L 41/0668 370/223 |
| 2014/0095725 A1* | 4/2014 | Thakur | ................. | H04L 45/00 709/228 |

(Continued)

*Primary Examiner* — Redentor M Pasia
(74) *Attorney, Agent, or Firm* — Martine Penilla Group, LLP

(57) ABSTRACT

Methods, systems, and computer programs are presented for managing a network in the presence of layer-2 loops. One method includes an operation for detecting, by a network device, a loop at a layer 2 of a network. The network device is configured to execute a network device operation system (ndOS), where network devices executing ndOS share a global switch table. The method further includes an operation for blocking ports associated with the loop where incoming packets received at the blocked ports are discarded except for loop-probe packets. Further, the method includes operations for sending loop-probe packets by one or more network devices executing ndOS through one or more ports, and for unblocking a first port of the blocked ports based on the loop-probe packets when a lack of receipt of a loop-probe packet within a predetermined amount of time is detected for the first blocked port which indicates that the first blocked port is not part of the loop.

19 Claims, 11 Drawing Sheets

(56) References Cited

U.S. PATENT DOCUMENTS

| | | | |
|---|---|---|---|
| 2014/0185611 A1* | 7/2014 | Lie | H04L 49/25 370/355 |
| 2015/0195102 A1* | 7/2015 | Mochida | H04L 12/437 370/223 |
| 2015/0331807 A1* | 11/2015 | Lie | G06F 12/1009 711/118 |

* cited by examiner

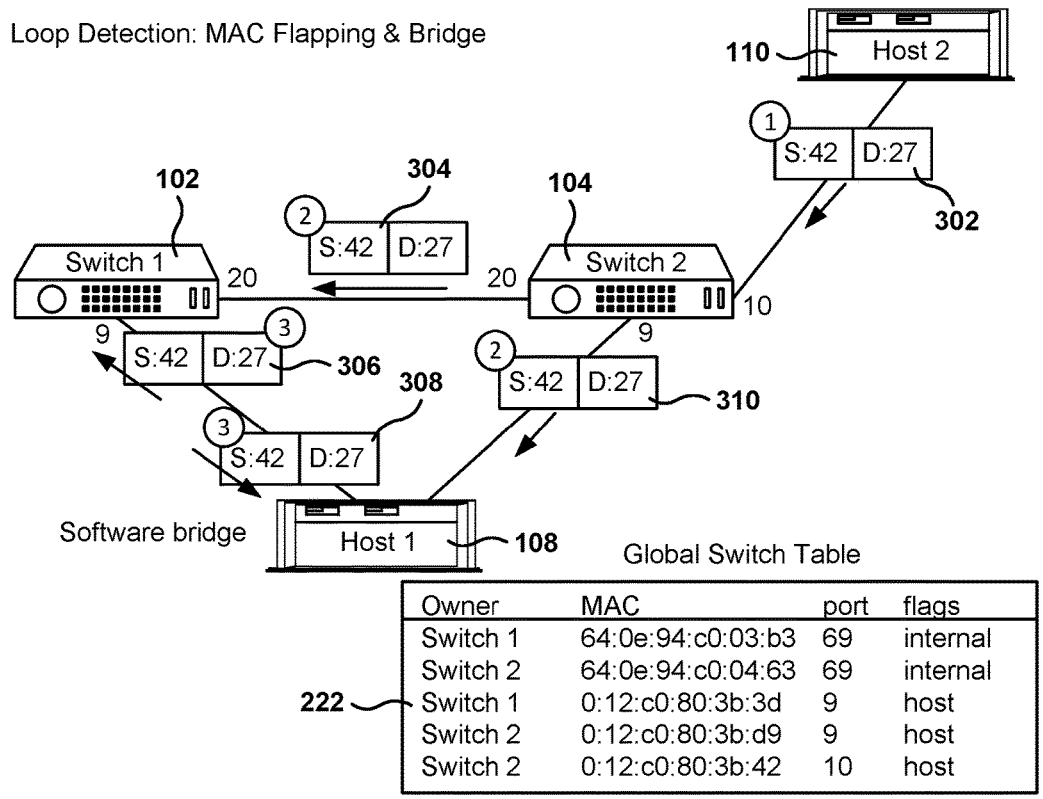
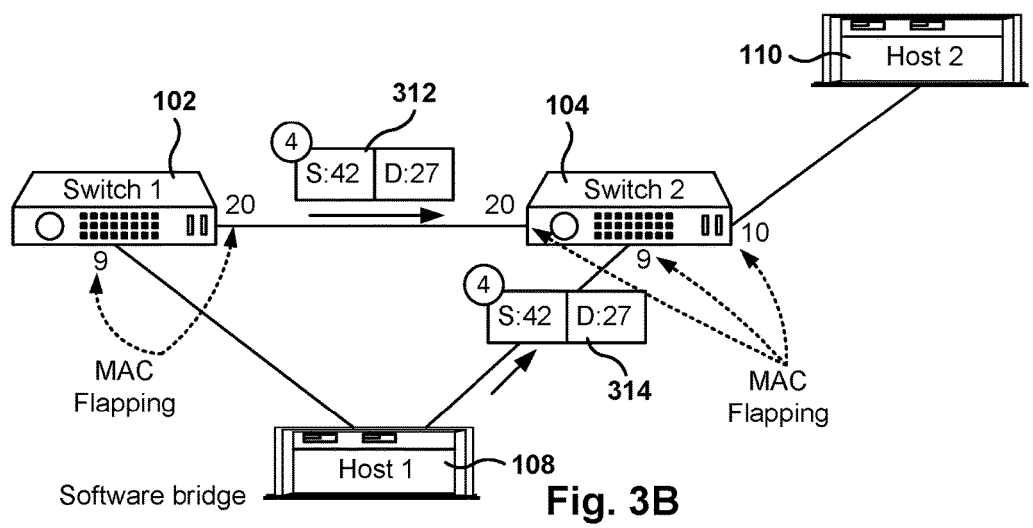
Fig. 3A
Fig. 3B

LOOP-FREE FABRIC UTILIZING DISTRIBUTED ADDRESS AND PORT TABLES

BACKGROUND

1. Field of the Invention

The present embodiments relates to methods, systems, and programs for managing a network in the presence of layer-2 loops.

2. Description of the Related Art

In some data centers, often times a tenant is assigned a set of bare-metal servers and the tenant installs hypervisors with virtual switches in the servers. The tenant manages the servers to provide a tenant-managed cloud manager. In high-end environments, the bare-metal server is trunked or configured for link aggregation to different top of the rack switches. Misconfiguration, incorrect cabling, or problems in the host virtual-switch can create loops in the network that impact the tenant as well as other tenants.

Network devices (e.g., network switches) generally implement some type of spanning tree protocol (STP) to detect and correct loops, but virtual switches in hosts may not participate in STP and loops created by the host are not detected nor managed.

It is in this context that embodiments arise.

SUMMARY

Methods, devices, systems, and computer programs are presented for managing a network in the presence of layer-2 loops. It should be appreciated that the present embodiments can be implemented in numerous ways, such as a method, an apparatus, a system, a device, or a computer program on a computer readable medium. Several embodiments are described below.

One general aspect includes a method for detecting, by a network device, a loop at a layer 2 of a network. The network device is configured to execute a network device operation system (ndOS), where network devices executing ndOS share a global switch table. The method also includes blocking ports associated with the loop at the global switch table, where incoming packets received at the blocked ports are discarded except for loop-probe packets. The method also includes sending loop-probe packets by one or more network devices executing ndOS through one or more ports. In one configuration, the one or more ports includes all ports. In another configuration, all ports includes internal and external ports. The method also includes unblocking a first port of the blocked ports based on the loop-probe packets when a lack of receipt of a loop-probe packet within a predetermined amount of time is detected, which indicates that the first blocked port is no longer part of the loop.

In one embodiment, a method is disclosed for detecting, by a network device, a loop at a layer 2 of a network of devices that share a global switch table. The method further includes blocking ports associated with the loop, such that incoming packets received at the blocked ports are discarded except for loop-probe packets. Then, sending loop-probe packets, by one or more network devices, via all ports including the blocked ports. The method includes unblocking a first port of the blocked ports based on the loop-probe packets. This occurs when a lack of receipt of a loop-probe packet within a predetermined amount of time is detected for the first blocked port which indicates that the first blocked port is not part of the loop. In this embodiment, the ndOS is not used, but other logic running on the network devices may process the method of operations to detected presence of layer-2 loops.

Another general aspect includes a network device having a plurality of external ports, a plurality of internal ports, and a control processor configured to execute a network device operation system (ndOS). Network devices executing ndOS share a global switch table, and the control processor is configured to detect a loop at a layer 2 of a network, where the control processor blocks external ports associated with the loop, and incoming packets received at the blocked external ports are discarded except for loop-probe packets. The control processor sends loop-probe packets through all ports including the blocked external ports to check status of the loop, where the control processor unblocks a first external port of the blocked external ports based on the loop-probe packets when a lack of receipt of a loop-probe packet within a predetermined amount of time is detected, which indicates that the first blocked external port is no longer part of the loop.

One general aspect includes a non-transitory computer-readable storage medium storing a computer program. The computer-readable storage medium includes program instructions for detecting, by a network device, a loop at a layer 2 of a network, where the network device is configured to execute a network device operation system (ndOS), where network devices executing ndOS share a global switch table. The storage medium also includes program instructions for blocking ports associated with the loop, where incoming packets received at the blocked ports are discarded except for loop-probe packets. The storage medium also includes program instructions for sending loop-probe packets by one or more network devices executing ndOS through the all external ports including the blocked ports. The storage medium also includes program instructions for unblocking a first port of the blocked ports based on the loop-probe packets when a lack of receipt of a loop-probe packet within a predetermined amount of time is detected, which indicates that the first blocked port is not part of the loop. Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 3A-3B illustrate the detection of a loop created by a host software bridge due to Media Access Control (MAC) flapping, according to one embodiment.

DETAILED DESCRIPTION

The following embodiments describe methods, devices, systems, and computer programs for managing a network in the presence of layer-2 loops. Embodiments presented herein describe solutions for detecting, logging, and mitigating misbehaved and/or misconfigured hosts to prevent looping layer-2 traffic. Additionally, embodiments detect and log the existence of misbehaving network equipment, operating in conjunction with Spanning Tree Algorithms (STP) (e.g., STP, RSTP, MSTP, TRILL) to prevent loops.

One method includes an operation for detecting, by a network device, a loop at a layer 2 of a network. The network device executes a network device operation system (ndOS), where network devices executing ndOS share a global switch table that maps MAC addresses to virtual ports. The method further includes an operation for blocking ports associated with the loop, where incoming packets received at the blocked ports are discarded except for loop-probe packets, which are packets used for the detection and verification of loops at the layer 2. Further, the method includes operations for sending loop-probe packets by one or more network devices executing ndOS through all external and internal ports including the blocked ports, and for unblocking a first port of the blocked ports based on the loop-probe packets when a lack of receipt of a loop-probe packet within a predetermined amount of time is detected, which indicates that the first blocked port is not part of the loop.

It will be apparent that the present embodiments may be practiced without some or all of these specific details. In other instances, well-known process operations have not been described in detail in order not to unnecessarily obscure the present embodiments.

Figure 1A:
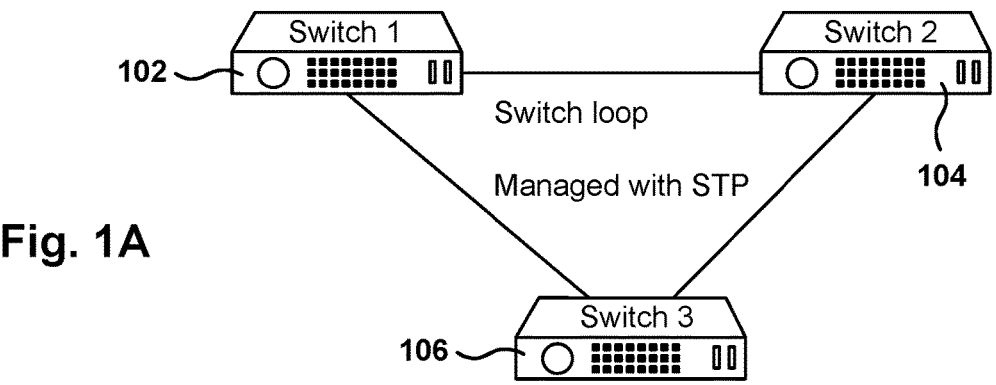
FIGS. 1A-1C illustrate the creation of loops in the layer 2 of a network, according to one embodiment.
Figure 1B:
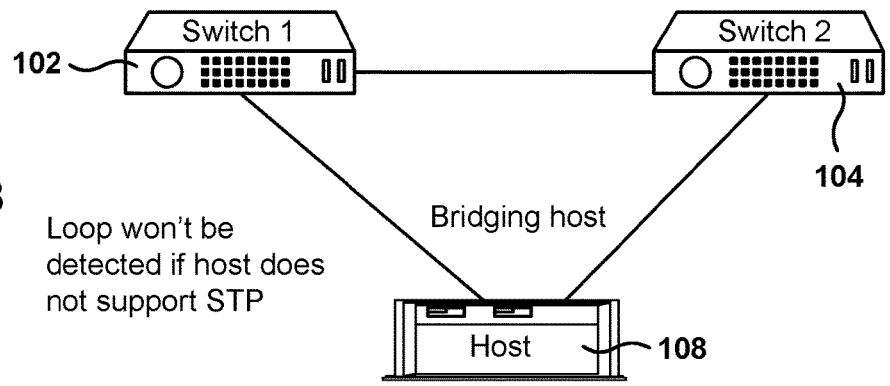
Figure 1C:
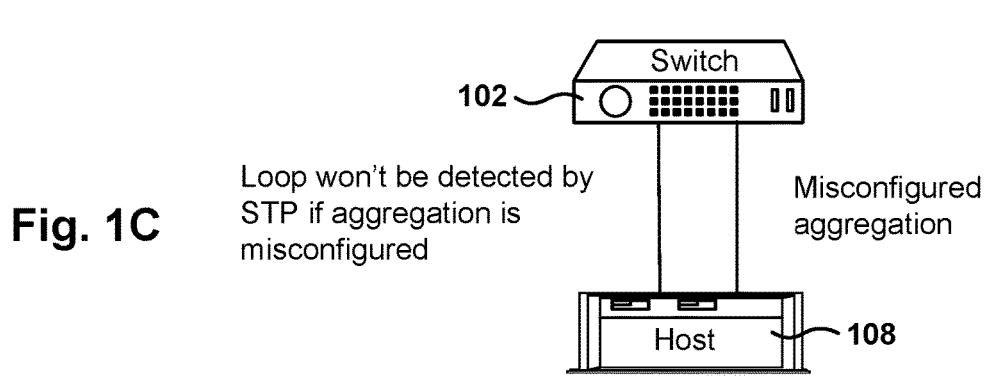

FIGS. 1A-1C illustrate the creation of loops in the layer 2 of a network, according to one embodiment. FIG. 1A illustrates a loop involving three network switches 102, 104, and 106. When there is a loop in layer 2 networking, a packet (e.g., Address Resolution Protocol (ARP) packet) may keep travelling through the network, being replicated throughout the different ports of network switches. The packet may flood all ports and the loop can quickly overwhelm all other traffic, bringing the network to a stop.

Some of the current methods to avoid loops are based on Spanning Tree Protocol (STP), TRILL, and other network protocols designed to detect loops by sharing information among network devices. These methods rely on communications between network devices to exchange topology information. Based on the topology, network devices can collectively determine if there are loops, where the loops are, and disable arcs in order to break the loops. In the example of FIG. 1A, all three network switches implement STP, therefore, any possible loops created are managed because of the shared use of STP.

But sometimes loops are created because of hosts connected to the switches. FIG. 1B illustrates a loop created by a bridging host 108. In one embodiment, host 108 is connected to two switches 102, 104, to provide redundant links for the host 108. For example, the host may have a hypervisor with a virtual switch. However, if the host is not configured correctly and the host is bridging packets at the layer 2, loops are created, as described in more detail below with reference to FIGS. 2A-2B, 3A-3B, and 4. For example, if the host is configured for redundant links (e.g., VLAG), but the switches are not aware of the aggregated links, then loops are created. STP won't be able to solve the problem, because the host is not running STP.

A misbehaving host, such as a host running a virtual switch that injects received packets back into the network, must not be able to cause packet loops. In one embodiment, the network switches log messages to notify the network administrator of the loop and the misbehaving/misconfigured host.

FIG. 1C illustrates a loop created by a misconfigured link aggregation, according to one embodiment. If the host is configured for aggregation, but the switches are not, then the switches see packets coming from the same host at two different ports, which should not happen in a properly configured network. For proper operation, both sides have to be aware that the two links are configured for aggregation.

Figure 2A:
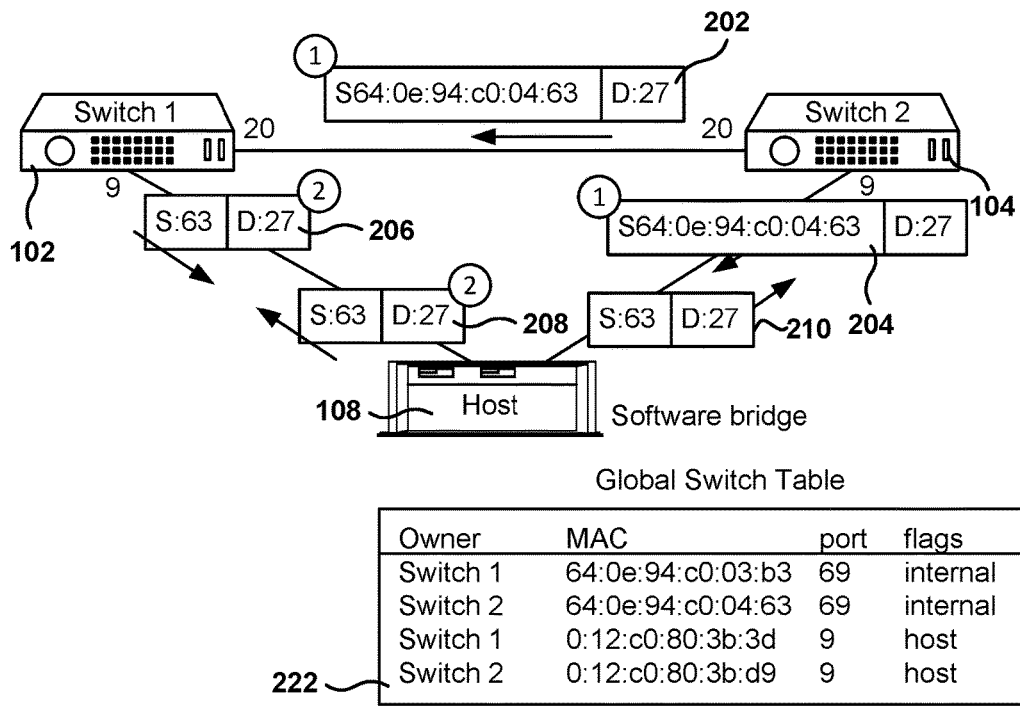
FIGS. 2A-2B illustrate the detection of a loop created by a software bridge on a host, according to one embodiment.
Figure 2B:
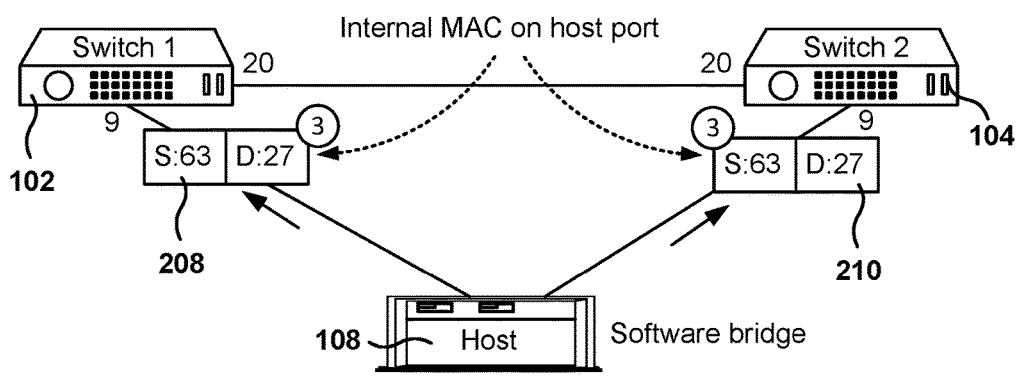

FIGS. 2A-2B illustrate the detection of a loop created by a software bridge on a host, according to one embodiment. FIG. 2A is a network with two network switches 102, 104, and a host 108 acting as a software bridge. The network switches execute a network device operation system (ndOS), where the network devices executing ndOS share a global switch table 222.

The ndOS switches are configured together into a fabric, and there are data structures shared among all the switches in the fabric. Some of that data includes information about virtual ports, referred to as vports. Global switch table 222 includes entries for vports, each entry including a network device ID (labeled Owner in FIG. 2A) where the vport is located, a MAC address, port ID for the virtual port, virtual LAN (Local Area Network) ID (the virtual LAN ID column is omitted in FIG. 2A for brevity), migration history of the port (omitted from the figure for brevity), and flags.

The migration history is kept to record the recent history of migrations for the MAC address, for example, when a host with the MAC address migrates to another port, on the same switch or on a different switch. The migration history for the port includes one or more of port ID, owner ID, and time of migration. Further, the flags in global switch table 222 include one or more of internal (associated with an internal port), host (the vport represents a host), and loop-probe (a special designation described in more detail below).

In the example of FIG. 2A, the switch table includes four entries: two entries for switch 1 and two entries for switch 2. Switch 1 owns an entry for internal port 69 with MAC address 64:0e:94:c0:03:b3, and owns another entry for external port 9 connected to a host with MAC address 0:12:c0:80:3b:3d. Switch 2 also owns two entries, an entry for internal port 69 with MAC address 64:0e:94:c0:04:63, and another entry for external port 9 connected to a host and with MAC address 0:12:c0:80:3b:d9. For simplicity of description, MAC addresses in the examples presented herein are sometimes referred to by their last byte (e.g., :b3 for 64:0e:94:c0:03:b3).

When a switch executing ndOS observes a MAC address for a VLAN on a particular port, the switch shares that information with all the other switches in the fabric executing ndOS. This way the global switch table is available in all the switches. This means that all the switches know about all the hosts connected to the switches, and all the switches share a common view of all the equipment connected to the network.

The global switch table 222, also referred to as the vport database, is distributed and replicated throughout the fabric so that each ndOS switch has its own copy of the vport database for the entire fabric. It should be understood that the vport database is not the same as the hardware switch table. The vport database includes the hardware switch tables for all switches in the fabric, as well as information about endpoints that are known to the fabric but no longer in the hardware switch table due to resource constraints.

In some embodiments, loops are detected by using the vport database to detect that the same MAC address (for a given VLAN) appears on more than one host port in the fabric. The ndOS distinguishes between legitimate migration of a host (e.g., due to Virtual Machine (VM) migration or to a roaming wireless user) and a layer-2 loop.

When a packet arrives at a network switch, the packet is forwarded, using the global switch table, to an appropriate external port in the network device. Accordingly, the switch fabric obtains the destination MAC address from the packet, and uses the destination MAC address and switch table to identify the external port over which to transmit the packet. Once the external port is identified, the packet is transmitted over the external port.

In one embodiment, the ndOS devices include internal ports, which are connected both to a CPU and to a switch chip. More details of the structure of the network switch are provided below with reference to FIGS. 9-11. Each internal port is assigned one or more MAC addresses and all the switches share information about all their vports, including the internal ports. Thus, every switch knows the MAC addresses of the internal ports in other ndOS switches. It should be understood that internal ports may be physical ports or virtual ports.

Sometimes, packets are sent through all ports of a network switch, an event referred to as flooding, such as when the switch forwards a packet whose MAC address is not present in the hardware switch table or the vport database. In the scenario of FIG. 2A, switch 104 switch sends the packet 202, 204, to all the external ports, except for the ingress port where the packet arrived (not shown). Packet 202 is sent out on port 20 and packet 204 is sent out on port 9. These packets are received by switch 102 and host 108, respectively.

Switch 102 receives the packet 202 and since switch 102 does not have MAC information for that destination MAC address (:27), switch 102 sends packet 206 via port 9 to host 108. Similarly, host 108 receives packet 204 and sends packet 208 to switch 102. Also shown is packet 206 being received by host 108 and then host 108 sending packet 210 to switch 204.

FIG. 2B shows what happens next. Packet 208 arrives at port 9 of switch 102, and packet 210, which has been forwarded by host 108, arrives at port 9 of switch 104. Thus, the packet has made its way around the loop in both directions, and now switch 104 receives a packet with a source MAC address :63 that is not associated with the port where the packet came in, instead being associated with one of the internal ports of switch 104. Under a proper operating network without loops, this shouldn't happen, so switch 104 determines that there is a problem because the switch received a packet with a source MAC address from one of its internal ports.

Similarly, on switch 102, a packet with the :63 source address came in on port 9, but the :63 MAC address does not match the MAC address associated with port 9, so the packet is processed under an exception. In some embodiments, the packet received is sent to the control processor, instead of being switched by the switch classifier in hardware.

The ndOS executing on the control processor checks the switch table and determines that the source mac address :63 is its own internal MAC address belonging to internal port 69. The fact that the packet came in on a different port indicates that something is wrong, in this case, that there is a layer-2 loop on the network.

The reason that the packet came in port 9 is because the host switched the packet. If the host wasn't running an internal switch, the loop wouldn't have happened. On switch 102, the packet is sent to the control processor also, because the packet with source MAC address :63 should have arrived on port 20. Switch 102 also detects the loop in its own port 9. It is noted that switch 102 is also aware of the internal ports of switch 104 because the switches share the global switch table 222.

FIGS. 3A-3B illustrate the detection of a loop created by a host software bridge due to MAC flapping, according to one embodiment. Another way of detecting loops is when MAC addresses migrate rapidly between ports, a phenomenon referred to herein as MAC flapping. FIG. 3A includes the two switches and the one host as in FIG. 2A, and an additional host 110 connected to switch 104.

The global switch table has an additional entry indicating that switch 104 (i.e., switch 2) is connected to a host on port 10 with a MAC address of 0:12:c0:80:3b:42.

Host 110 sends packet 302 into the network towards switch 104, the packet having source MAC address of host 110, MAC address :42. Switch 104 forwards the packet on all of its remainder ports, thus packet 304 is sent to switch 102 and packet 310 is sent to host 108. Host 110 sends similar packets (not shown). The packets also bounce around the network. As before, the packets are forwarded by switch 102 and host 108, which send packets 308 and 306 respectively.

FIG. 3B shows how packets 312 and 314 now arrive at switch 104, which sees packets with a source address :42 arriving at ports 10, 20, and 9, that is, the MAC address is "flapping" between ports because it is migrating quickly. Also, packets with a source address of host 110 are arriving at ports that are not associated with host 110. Similarly, switch 102 sees packets with source address :42 from host 110 arriving within a small amount of time on ports 9 and 20.

MAC address :42 is a host MAC address, so ndOS does not have as much confidence in knowing where the real host is as if the MAC address belonged to one of the ndOS switches. For example, the host MAC address may move around for several reasons, such as a virtual machine migration (e.g., for load balancing), or a user moving around the network with a laptop. But when a user moves around, the MAC addresses do not move very fast. However, if there is a loop, address flapping may take place many times per second.

The switches observe the MAC address moving between different ports many times a second. The ndOS in the switch stores a history of migration within each vport entry, so when there is a source MAC miss and the processor checks the history of the vport migration, ndOS determines that this MAC address is moving too fast for being a user or a VM on the move. The ndOS then concludes that there is a loop involving the identified ports. In one embodiment, the MAC address is considered to be flapping when it moves more than once within a predetermined threshold period, which may be in the range from 2 to 60 seconds or more. In other embodiments, the MAC address is considered to be flapping when it moves more than twice within the predetermined threshold period.

Figure 4:
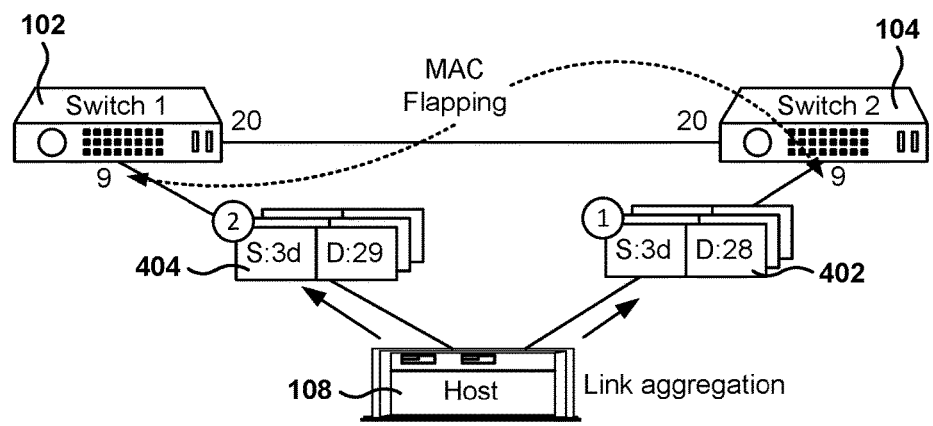
FIG. 4 illustrates the detection of a loop created because of a misconfigured link aggregation, according to one embodiment.

FIG. 4 illustrates the detection of a loop created because of a misconfigured link aggregation, according to one embodiment. In this scenario, there is a misconfigured aggregation configuration for host 108 that has links to switch 102 and switch 104. The global switch table 222 has an entry for host 108, which is the last entry identifying host 108 connected to switch 102 on port 9, but the connection between host 108 and switch 104 is not known by the ndOS switches. The entry for the link between host 108 and switch 104 is missing from the table, as well as a flag indicating that host 108 is aggregating links. If the aggregation were configured correctly, ndOS would expect to see host 108 on both switch 102 port 9 and switch 104 port 9, but the configuration is not correct and a loop is created.

Host 108 is sending packets 402, 404, on both ports because host 108 is load balancing utilizing the same source MAC address :3d. Both switches see the :3d MAC address on their respective ports 9, and as the packets come in, the switches exchange messages to notify each other, "MAC address :3d is on my port 9." As a result, the global switch table 222 is being updated very fast between switches 102 and 104 for MAC address :3d. At any given time, only one switch would have that MAC address identified with one of its ports because there is no configuration for the aggregated links.

After the MAC address moves back and forth between ports 9 of the two switches, the flapping detection mechanism is triggered (because the ndOS switches keep track of the history of migration for the port), and the loop is detected.

In one embodiment, the global switch table keeps track of the last four migrations of the vport, including the respective timestamps. MAC addresses are allowed to move between ports, but if the move is within a predetermined threshold period from the last migration, then a loop is assumed to be in the network. In one embodiment, the threshold period is 10 seconds, but other embodiments may have threshold periods in the range from 1 second to 30 seconds. Further, the threshold may be adjusted depending on the application being executed at host 108. In other embodiments, the MAC address is considered to be flapping when it moves more than twice within the predetermined threshold period.

Figure 5:
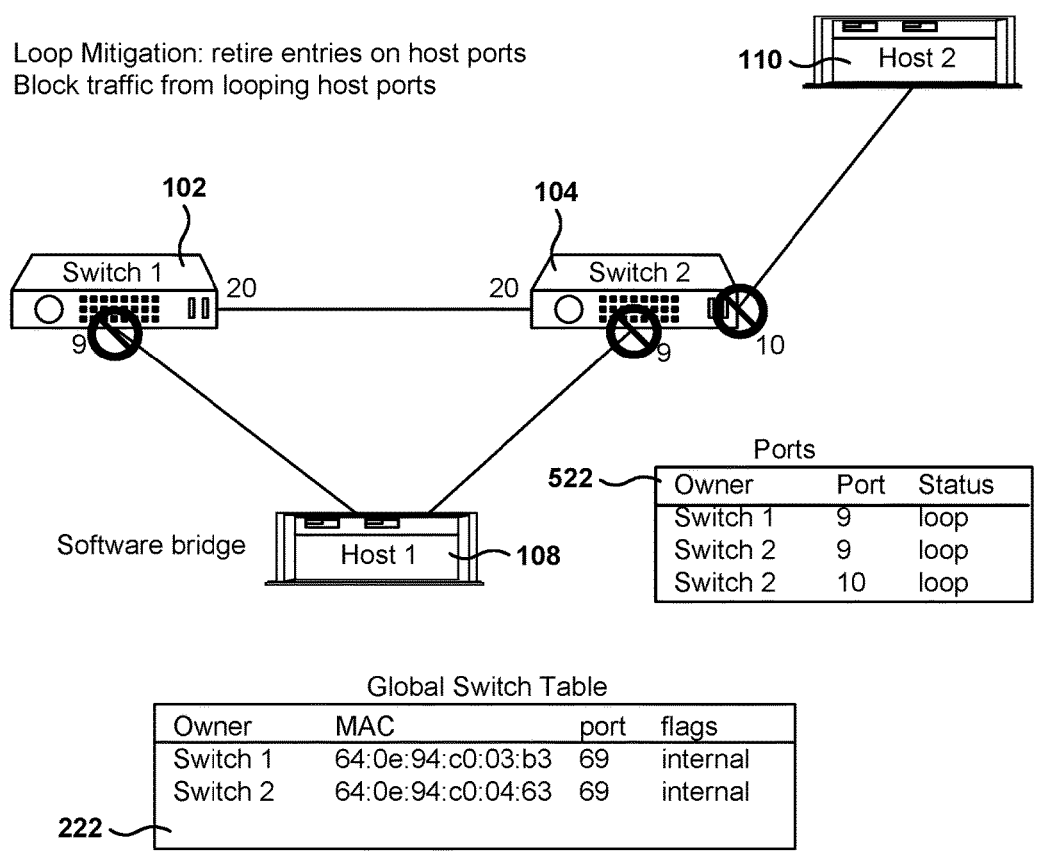
FIG. 5 illustrates loop mitigation by blocking ports, according to one embodiment.

FIG. 5 illustrates loop mitigation by blocking ports, according to one embodiment. Once the loop is detected, a loop mitigation procedure is started. In one embodiment, the global switch table 222 is used to prevent traffic looping. A ports table 422 includes information about ports, such as if the port is up or down, the status, etc. In one embodiment, there is a port status called "loop" which means that the port is considered to be looping. When the loop is detected, the ports associated with the loop are flagged as being in loop status. As discussed earlier, port 9 in switch 102 has been detected as part of the loop, as well as ports 9 and 10 on switch 104.

The ndOS removes all the vport entries for the port that is looping for the corresponding vlan from the switch hardware. It is noted that the embodiments described herein refer to a given vlan. For example, if a host were bridging vlan 100 but not vlan 101, then vlan 101 would not be affected by the loop, since the switches are trying to eliminate the loop in vlan 100. Port 9 is blocked only on the vlans where loops were detected.

FIG. 5 shows that the looping ports have been blocked in ports table 522. For simplicity purposes, the vport entries have been omitted because the ports are blocked, but in one embodiment, the entries are kept (e.g., to track the history of the vport), but the MAC addresses are not switched by the hardware.

It is noted that port 10 on switch 104 has been blocked, therefore host 110 has been practically disconnected from the network, although host 110 is properly configured. Further, it is noted that ports 20 on the switches are not blocked because these ports are connected to other network switches. It is assumed that switch-facing ports will resolve loop problems via the use of STP or other loop-resolution protocols. In another embodiment, switch-facing ports are also blocked.

The result of removing the MAC entries is that packets arriving on these ports will be transferred to the processor and not switched by the hardware because there is no MAC table entry for those ports. For example, when another host (not shown) connected to switch 104 sends a packet using host 2 MAC address, then the hardware sends the destination-MAC-miss to the processor. The processor sends the packet to all the ports, except for the ports that are looping. This prevents the loop from continuing to loop packets. Further, packets sent to host 108 from other hosts will not make it to host 108, and the packets sent from host 108 will not be transmitted to other hosts either.

Figure 6A:
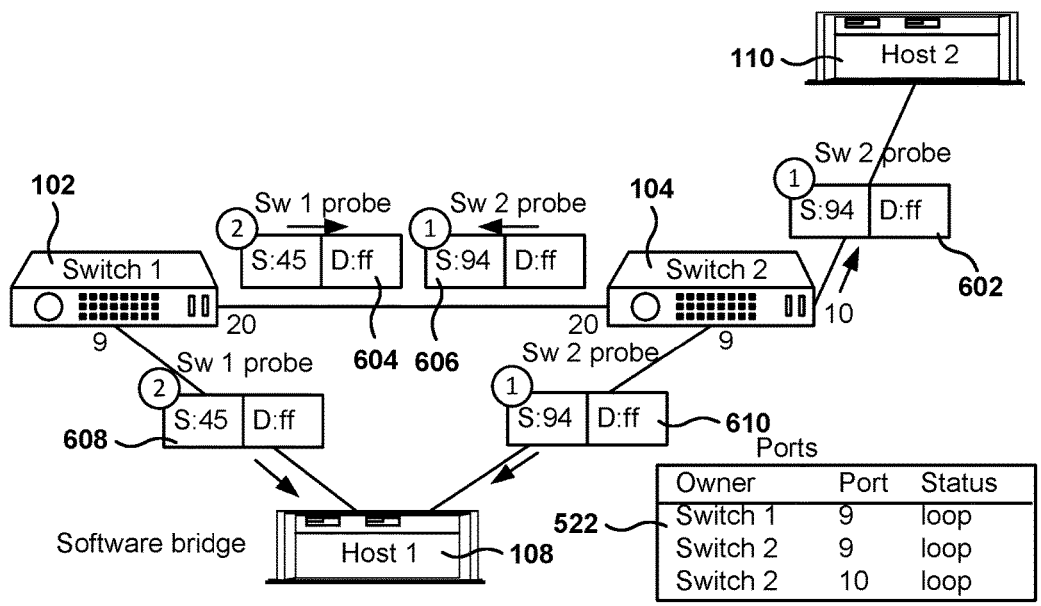
FIGS. 6A-6B illustrate the use of loop-probe packets to determine if the loop is still present, according to one embodiment.
Figure 6B:
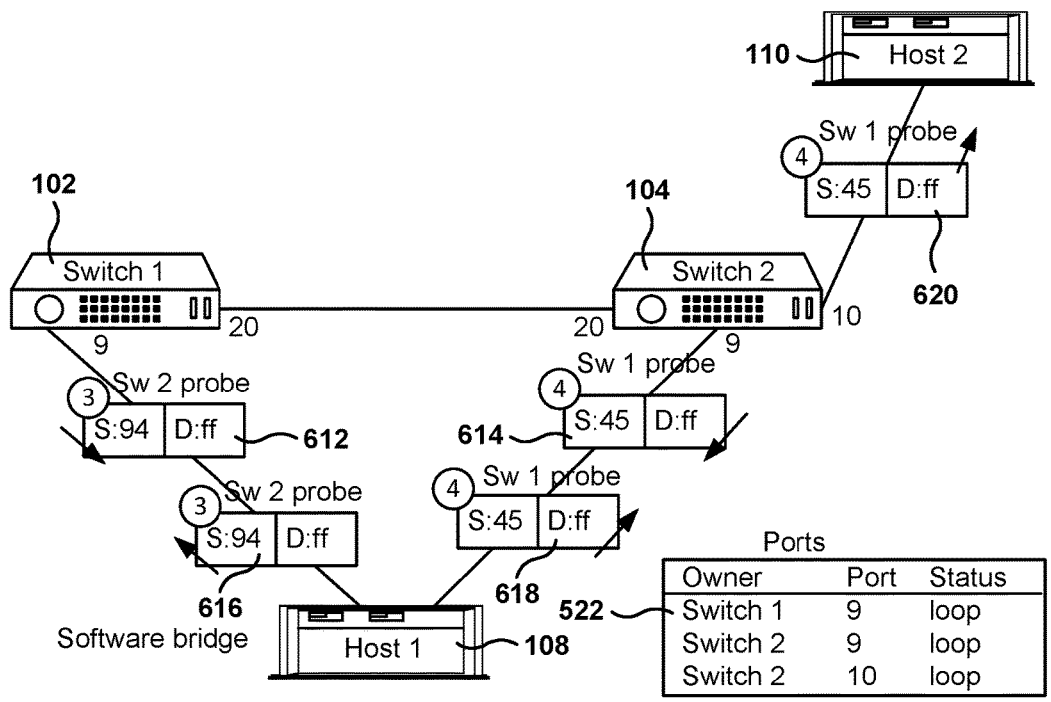

FIGS. 6A-6B illustrate the use of loop-probe packets to determine if the loop is still present, according to one embodiment. After the looping ports have been blocked, there are two problems remaining. The first one is that host 110 has been disconnected from the network although host 110 is properly configured and not part of the loop. The second problem is that after the loop is detected, messages are logged for the administrator in order to correct the loop problem, but a mechanism is needed for the network switches to detect when the administrator has fixed the loop.

In one embodiment, loop-probe packets are used to solve these problems. A loop-probe packet is a special packet used for testing loops. In each switch were a looping port has been detected, a new special vport entry is created with a flag of loop-probe. The loop-probe vport entry is communicated to other ndOS switches as an update to global switch table 222.

The bottom 2 entries on global switch table 222 are for two new vports with new MAC addresses and port 69, which is an internal port, and a loop-probe flag. These new MAC addresses are used to send the loop-probe packets to test for loops.

The goals of using loop-probe packets are to determine if the loop is still in the network and to unblock ports (e.g., port 10 connected to host 110) that are not part of the loop. If the loop is still present, the loop-probe packets will come back on the wrong ports.

Switches 102 and 104 send loop-probe packets. Switch 102 sends packet 604 on port 20 to switch 104, and packet 608 on port 9 to host 108, both with source MAC address :45 of internal port 69. Switch 104 sends packet 602 on port 10 to host 110, packet 606 on port 20 to switch 102, and packet 610 on port 9 to host 108, all with source MAC address :94 of its internal port 69. Each one of packets 602, 604, 606, 608, and 610 have a destination MAC address of "ff:ff:ff: ff:ff:ff" which is the broadcast MAC address. In FIG. 6A, the broadcast MAC address is abbreviated as "ff."

FIG. 6B illustrates how loop-probe packets continue traversing the network. Host 108 receives packet 610 and forwards it to switch 102 as packet 616, and packet 608 as packet 618. Similarly, switch 102 forwards packet 606 as packet 612 towards host 108, and switch 104 forwards packet 604 as packet 620 to host 110 and packet 614 to host 108. The destination address of the loop probe packets are also abbreviated as "ff," as was done in FIG. 6A.

Host 110 is not bridging packets, so the loop-probe packets sent to host 110 do not propagate further. The loop probe packets continue working their way around the network in the loop formed by switch 102, switch 104, and host 108. Therefore, switches 102 and 104 see the loop-probe packets come from the host but with a source MAC address of an internal port from either switch. The loop-probe packets show that the loop involving host 108 is still in the network.

Figure 7:
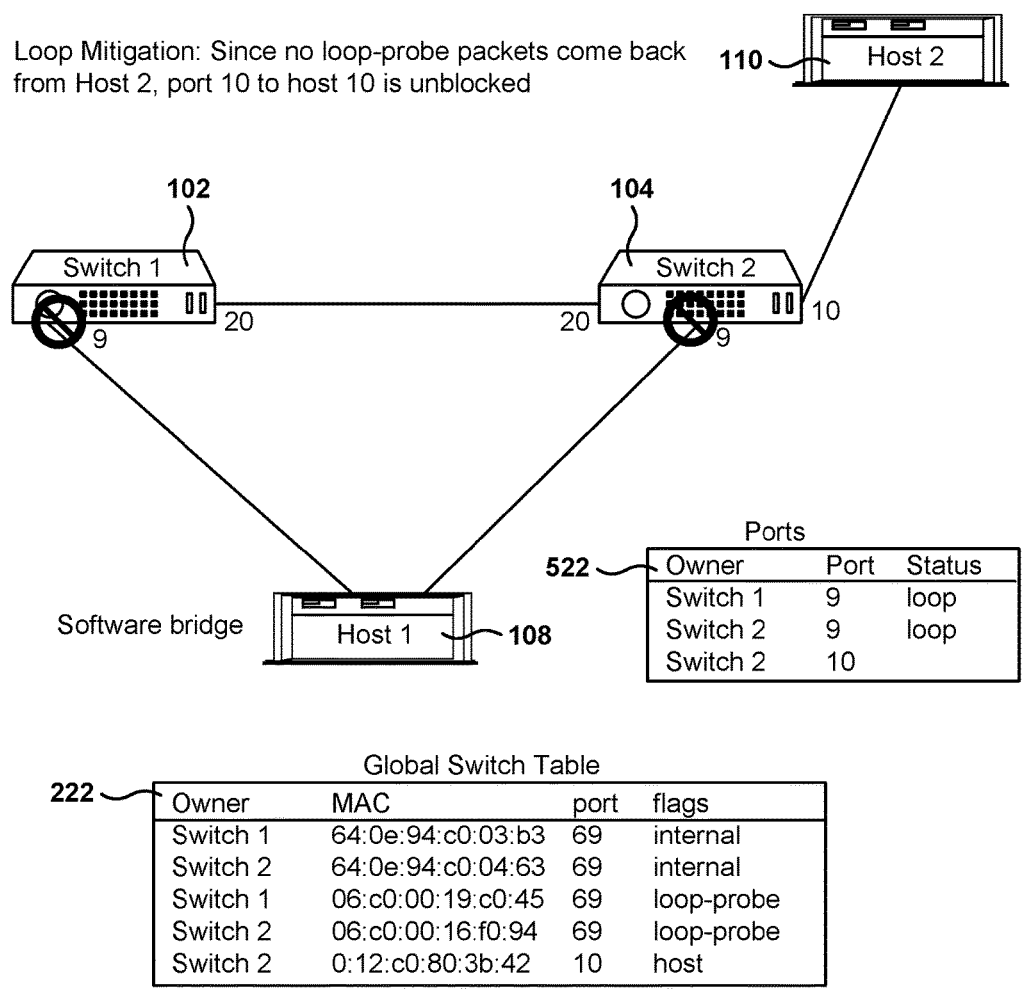
FIG. 7 illustrates the unblocking of a port when the port is not in a loop, according to one embodiment.

FIG. 7 illustrates the activation of a port when the port is not in a loop, according to one embodiment. After sending the loop-probe packets, the switches do not see the loop-probe packets coming back from host 110. After a predetermined amount of time without receiving loop-probe packets from host 110, the loop status is removed from port 10 on switch 104. Switch 104 has an entry for host 110 on port 10 again and host 110 is able to communicate with the network.

On the other hand, probe packets are still arriving on both ports 9, therefore host 108 continues to be "quarantined," that is, the ports associated with host 108 continue to have the loop status. As shown on FIG. 7, both ports 9 on switches 102 and 104 are still blocked (e.g., the status is "loop"), but port 10 on switch 104 is now unblocked to allow host 110 to send and receive packets.

In one embodiment, a plurality of loop-probe packets (e.g., 3, 5, or, 10 packets) are sent, a packet being sent every 3 seconds on all the vport/vlan identified as looping. After 3 loop-probe packets are sent without receiving any back in a looping port, then the loop status is cleared. Therefore, after 9 seconds, the status is cleared for port 10 on switch 104. Host 2 has been blocked for 9 seconds. Other embodiments may utilize a different sending frequency (e.g., packets are sent every 1-10 seconds), and the threshold amount of time may be in the range between 3 and 30 seconds. Host 1 remains isolated from the network until the system administrator corrects the problem, such as by configuring host 108 to disable the software bridge.

In summary, to check for loops on the network, loop-probe packets are sent on all ports. In another embodiment, the loop-probe packets may be sent on a subset of all ports, including the looping ports and possibly additional ports. The network switches track which loop-probe packets make their way back to the sending switches, and also track for loop-probe packets with source MAC addresses of internal ports from any ndOS switches coming from ports associated with hosts. If the loop-probe packets arrive on ports flagged as looping, the ports retain the status of looping. However, if after a threshold amount of time the loop-probe packets do not come back on a port flagged as looping, then the switches determine that the port is not looping and remove the looping status of the port and unblock the port.

Figure 8:
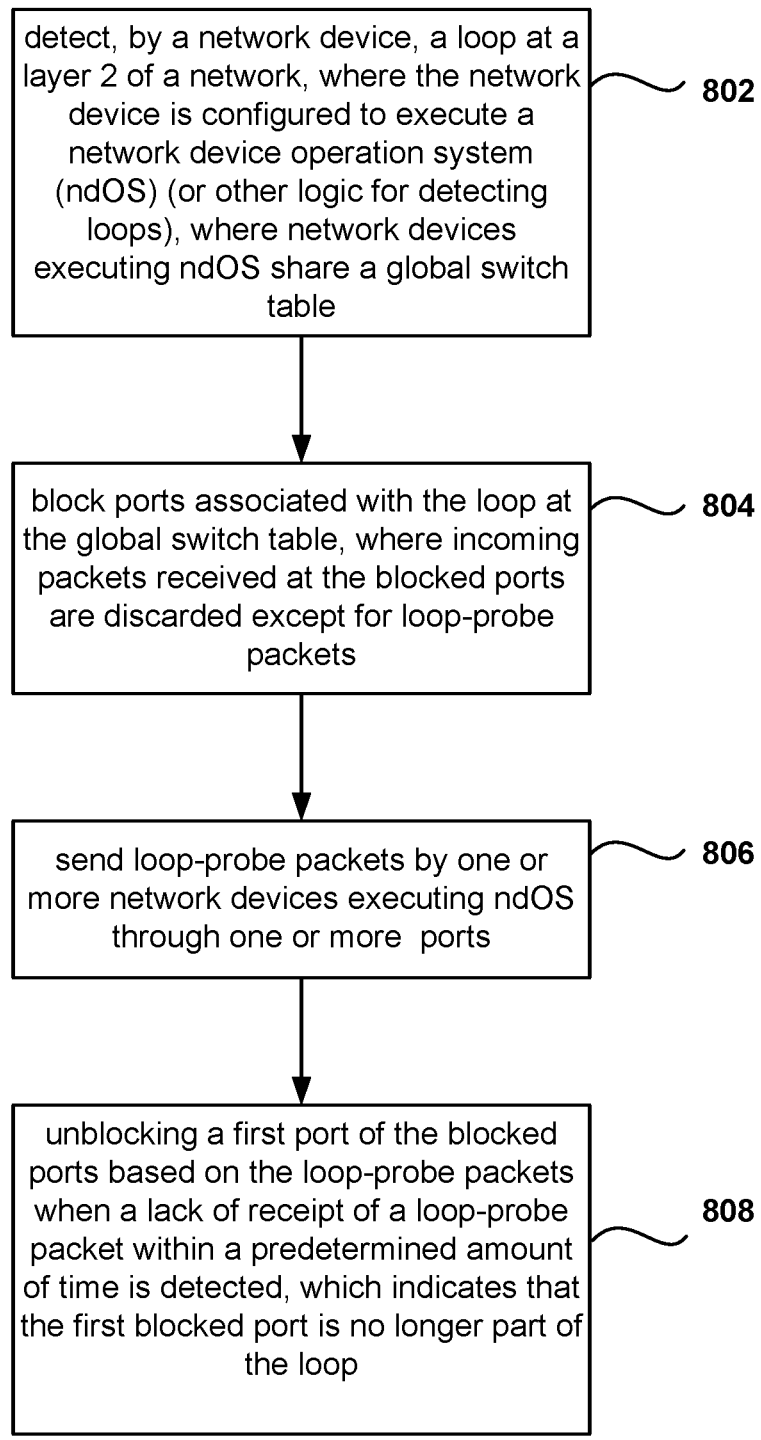
FIG. 8 shows a flowchart illustrating an algorithm for disabling layer-2 loops, in accordance with one embodiment.

FIG. 8 shows a flowchart illustrating an algorithm for disabling layer-2 loops, in accordance with one embodiment. While the various operations in this flowchart are presented and described sequentially, one of ordinary skill will appreciate that some or all of the operations may be executed in a different order, be combined or omitted, or be executed in parallel.

In operation 802, a network device detects a loop at a layer 2 of a network, where the network device is configured to execute a network device operating system (ndOS), and network devices executing ndOS share a global switch table. From operation 802, the method flows to operation 804 where ports associated with the loop are blocked, and incoming packets received at the blocked ports are discarded except for the loop-probe packets.

From operation 804, the method flows to operation 806 for sending loop-probe packets by one or more network devices executing ndOS through all ports. From operation 806, the method flows to operation 808 for unblocking a first port of the blocked ports, based on the loop-probe packets, when a lack of receipt of a loop-probe packet within a predetermined amount of time is detected, which indicates that the first blocked port is not part of the loop.

In one embodiment, detecting a loop further includes receiving a packet at a first port associated with a host in the global switch table; detecting that the packet has a source address of an internal port, where the internal port is a port inside of one of the network devices executing ndOS, and the global switch table includes an entry for the internal port; and determining that the first port is part of the loop. In one embodiment, the internal port is within the network device that received the packet, and in other embodiment, the internal port is within a different network device that the network device that received the packet.

In one embodiment, detecting a loop further includes tracking transitions between ports of media access control (MAC) addresses in the global switch table; detecting that a first MAC address has transitioned between a first plurality of ports at least a threshold number of times within a predetermined time period; and determining that ports, from the first plurality of ports, that are associated with hosts are part of the loop. In one embodiment, the first plurality of ports are on a same network device that is executing ndOS, and in another embodiment, the first plurality of ports are on a plurality of network devices executing ndOS.

In some embodiments, an entry in the global switch table includes network device ID, MAC address, port ID, virtual LAN ID, migration history of the port, and flags, and the migration history of the port includes one or more of port ID, owner ID, and time of migration. The flags include one or more of internal, host, and loop-probe.

In some embodiments, the network devices executing ndOS exchange messages regarding updates to the global switch table.

In one embodiment, blocking ports further includes assigning a status of looping to the blocked ports, where network traffic through ports with looping status is discarded except for the loop-probe packets.

In some embodiments, the loop-probe packets have a source MAC address of an internal port from one of the network devices executing ndOS. In some embodiments, a first customer-visible message is logged indicating that a loop has been detected, and a second customer-visible message is logged, in response to unblock the first port, indicating that the first port has been unblocked and that the first port is not part of the loop.

Figure 9:
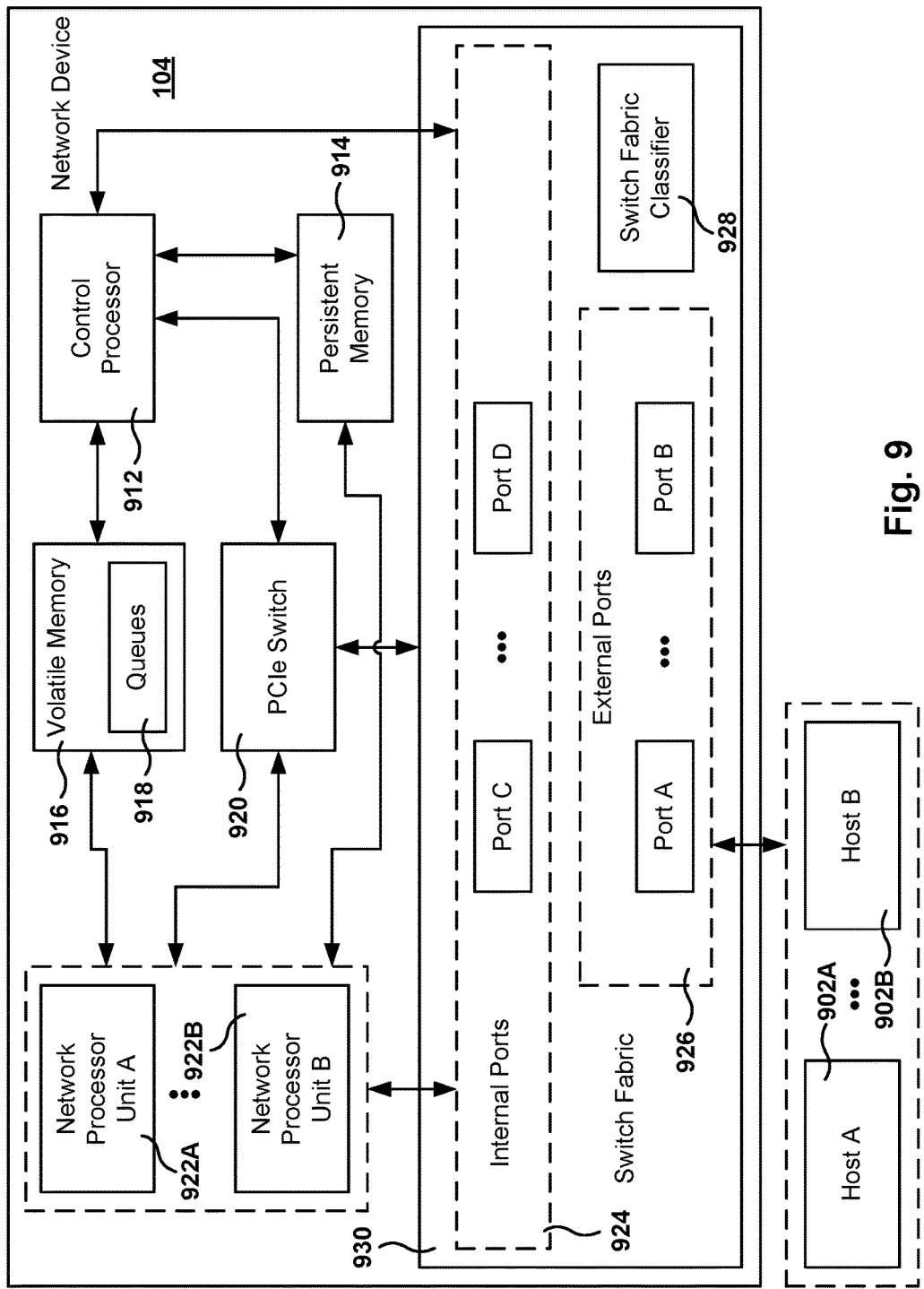
FIG. 9 shows a network device in accordance with one or more embodiments.

FIG. 9 shows a network device in accordance with one or more embodiments. In one or more embodiments, the network device 104 includes external ports 926, internal ports 924, a switch fabric classifier 928, one or more network processing units (NPUs) 922A-922B, also referred to herein as packet processors, a control processor 912, persistent memory 914, a Peripheral Component Interconnect Express (PCIe) switch 920, switch fabric 930 and volatile memory 916. As noted earlier, the internal ports 924 may be physical ports or virtual ports.

In one embodiment, the network device 104 is any physical device in a network that includes functionality to receive packets from one network entity and send packets to another network entity. Examples of network devices include, but are not limited to, single-layer switches, multi-layer switches, and routers. Network entities correspond to any virtual or physical device on a network that is configured to receive packets and send packets. Examples of network entities include, but are not limited to, network devices (defined above), virtual machines, host operating systems natively executing on a physical device (also referred to as hosts, see, e.g., 902A, 902B), virtual network appliances (e.g., virtual switch, virtual router), and physical network appliances (e.g., firewall appliance).

The network device 104 (or components therein) may be implemented using any combination of hardware, firmware, and/or software. With respect to the hardware, the network device may be implemented using any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof.

In one embodiment, the switch fabric 930 includes one or more internal ports 924, one or more external ports 926, and the switch fabric classifier 928. In one embodiment, the switch fabric classifier 928 may be implemented using an on-chip or off-chip Ternary Content Addressable Memory (TCAM) or other similar components. In one embodiment, the internal and external ports correspond to virtual or physical connection points. In one embodiment, the switch fabric may be implemented using packet switching, circuit switching, another type of switching, or any combination thereof. The external ports 926 are configured to receive packets from one or more hosts 912A-912B and to send packets to one or more hosts 912A-912B. While FIG. 9 shows the external ports connected only to hosts 912A-912B, the external ports 926 may be used to send and receive packets from any network entity including other instances of network devices described by FIG. 9.

In one embodiment, the internal ports 924 are configured to receive packets from the switch fabric 924 and to send the packets to the control processor 912 (or more specifically, the ndOS executing on the control processor) and/or to an NPU (922A, 922B). Further, the internal ports are configured to receive packets from the control processor 912 (or more specifically, the ndOS executing on the control processor) and the NPUs (922A, 922B).

In one embodiment, the control processor 912 is any processor configured to execute the binary for the ndOS. In one embodiment, the NPU is a specialized processor that includes functionality to processes packets. In one embodiment, the NPU may be implemented as any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof. In one embodiment, the network device (104) may also include Field Programmable Gate Arrays (FPGAs) and/or Application Specific Integrated Circuits (ASICs) that are specifically programmed to process packets. In one embodiment, the network device may include FPGAs and/or ASICs instead of NPUs. In one embodiment, processing packets includes: (i) processing the packets in accordance with layer 2, layer 3 and/or layer 4 protocols (where all layers are defined in accordance with the OSI model), (ii) making a copy of the packet, (iii) analyzing (including decrypting and/or encrypting) the content of the header and/or payload in the packet, and/or (iv) modifying (including adding or removing) at least a portion of the header and/or payload in the packet.

In one embodiment, the switch fabric 930 is configured to: (i) send packets received from the internal ports 924 to the appropriate external ports 926 and (ii) send packets received from the external ports 926 to the appropriate internal ports 924.

In one embodiment, the switch fabric classifier 928 is configured to apply a classification rule to each packet received by the switch fabric to determine: (i) whether to send the received packet to an external port, (ii) whether to send the received packet to an internal port, and/or (iii) whether to send the received packet to the PCIe switch 920.

In one embodiment, the classification rule includes a classification criteria and an action. In one embodiment, the classification criteria specifies a media access control (MAC) address, an Internet Protocol (IP) address, a Transmission Control Protocol (TCP), user datagram protocol (UDP), an OSI layer 4 information related to a TCP ports, an IPSec security association (SA), a virtual local area network (VLAN) tag, a 802.1Q VLAN tag, or a 802.1Q-in-Q VLAN tag, or any combination thereof. In one embodiment, the action corresponds to an action to be performed when a packet satisfying the classification rule is identified. Examples of actions include, but are not limited to, (i) forward packet to the control processor (via a specific internal port or the PCIe switch), (ii) forward packet to an NPU (via a specific internal port or the PCIe switch), and (iii) send a copy of the packet to a specific external port, count the packet into one byte and packet counter or into a plurality of such counters based on further criteria such as packet size, latency, metadata such as physical ports for ingress or egress, etc., add meta data to any copied or forward packet such as timestamps, latency, physical ingress or egress path, etc.

In one embodiment, the switch fabric 930 is configured to communicate with the control processor 912 and/or the NPUs 922A-922B using a Peripheral Component Interconnect Express (PCIe). Those skilled in the art will appreciate the other hardware based switching frameworks/mechanisms may be used in place of (or in addition to) PCIe.

In one embodiment, the persistent memory 914 is configured to store the binary for the ndOS. The persistent memory 914 may be implemented using any non-transitory storage mechanism, e.g., magnetic storage, optical storage, solid state memory, etc. In some embodiments, the ndOS may be omitted and other processing logic may be executed to determine presence of layer-2 loops.

In one embodiment, the volatile memory 916 is configured to temporarily store packets in one or more queues 918. The volatile memory may be implemented using any non-persistent memory, e.g., RAM, DRAM, etc. In one embodiment, each of the queues is configured to only store packets for a specific flow. In one embodiment, a flow corresponds to a group of packets that satisfy a given classification rule.

It is noted that the embodiments illustrated in FIG. 9 are exemplary. Other embodiments may utilize different communication interfaces (Ethernet, PCIe, PCI, etc.), network devices with fewer components or additional components, arrange the components in a different configuration, include additional interconnects or have fewer interconnects, etc.

The embodiments illustrated in FIG. 9 should therefore not be interpreted to be exclusive or limiting, but rather exemplary or illustrative.

Figure 10:
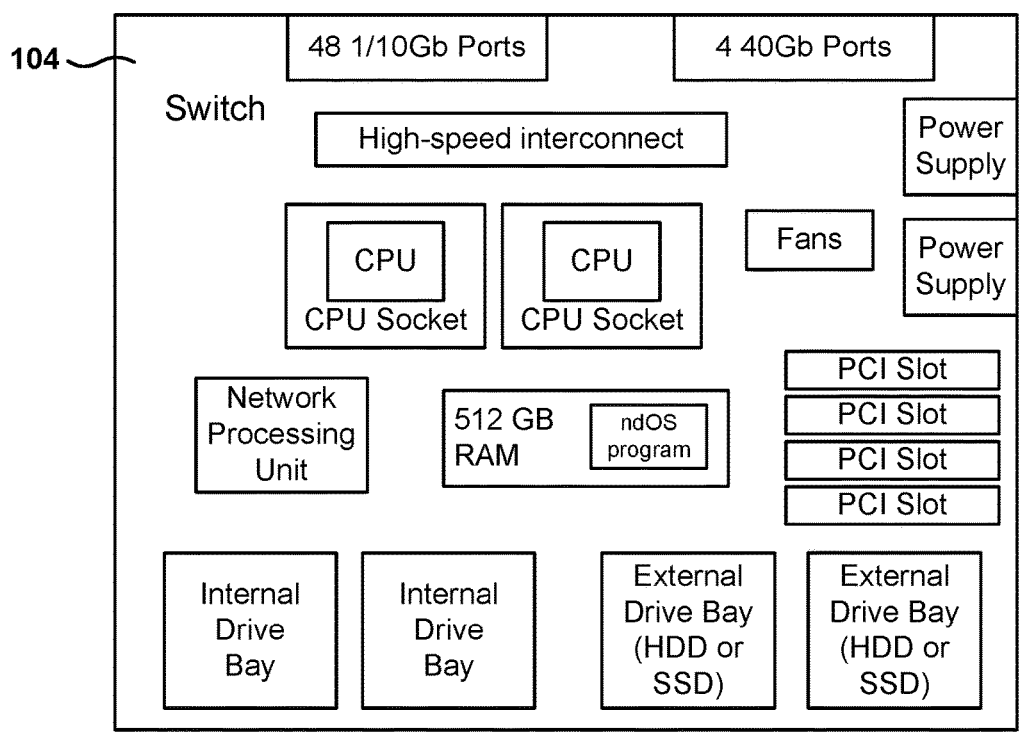
FIG. 10 illustrates an exemplary embodiment of a network device.

FIG. 10 illustrates an exemplary embodiment of a network device. The exemplary ndOS switch 104 includes a plurality of Ethernet ports (e.g., 48 1/10 Gb ports and 4 40 Gb ports), a high-speed interconnect that connects the internal modules within the switch (e.g., PCIe, Ethernet), and 2 CPU sockets for hosting 2 respective CPUs.

The ndOS switch 104 further includes a networking processing unit and RAM (e.g., 512 Gb), which may host the ndOS program while being executed by the one or more CPUs. The switch 104 further includes 2 drive bays for internal non-volatile storage, and 2 external drive bays for external storage (e.g., hard disk drive (HDD) or solid state drive (SSD)). Additionally, the ndOS switch 104 includes one or more power supplies, PCI slots (e.g., 4 PCI slots), and fans.

It is noted that the embodiment illustrated in FIG. 10 is exemplary. Other embodiments may utilize different components, have more or less amount of any of the components, include additional components, or omit one or more components. The embodiment illustrated in FIG. 10 should therefore not be interpreted to be exclusive or limiting, but rather exemplary or illustrative.

Embodiments of the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
    detecting, by a network device, a loop at a layer 2 of a network, wherein the network device is configured to execute a network device operation system (ndOS), wherein network devices executing ndOS share a global switch table;
    blocking ports associated with the loop, wherein incoming packets received at the blocked ports are discarded except for loop-probe packets;
    sending loop-probe packets by one or more network devices executing ndOS through the one or more ports of the network devices; and
    unblocking a first port of the blocked ports based on the loop-probe packets when a lack of receipt of a loop-probe packet within a predetermined amount of time is detected for the first blocked port which indicates that the first blocked port is not part of the loop, and wherein detecting the loop further includes:
        tracking transitions between ports of media access control (MAC) addresses in the global switch table;
        detecting that a first MAC address has transitioned between a plurality of ports at least a threshold number of times within a predetermined time period; and
        determining that ports, from the plurality of ports, that are associated with hosts are part of the loop.

2. The method as recited in claim 1, wherein detecting the loop further includes:
    receiving a packet at a host-facing port that is associated with a host in the global switch table;
    detecting that the packet has a source address of an internal port, wherein the internal port is a port inside of one of the network devices executing ndOS, wherein the global switch table includes an entry for the internal port; and
    determining that the host-facing port is associated with the loop.

3. The method as recited in claim 2, wherein the internal port is within the network device that received the packet.

4. The method as recited in claim 2, wherein the internal port is within a different network device than the network device that received the packet.

5. The method as recited in claim 1, wherein the plurality of ports are on a same network device that is executing ndOS.

6. The method as recited in claim 1, wherein the plurality of ports are on a plurality of network devices executing ndOS.

7. The method as recited in claim 1, wherein the network devices executing ndOS exchange messages regarding updates to the global switch table.

8. The method as recited in claim 1, wherein blocking ports further includes:
assigning a status of looping to the blocked ports, wherein network traffic through ports with the status of looping is discarded except for the loop-probe packets.

9. The method as recited in claim 1, wherein the loop-probe packets have a source MAC address of an internal port from one of the network devices executing ndOS.

10. The method as recited in claim 1, further including:
logging, in response to detecting the loop, a first customer-visible message indicating that the loop has been detected; and
logging, in response to unblocking the first port, a second customer-visible message indicating that the first port has been unblocked and that the first port is not part of the loop.

11. The method as recited in claim 1, wherein unblocking the first port further includes:
determining that the sent loop-probe packets do not return back to the first port for a predetermined period of time; and
unblocking the first port based on the determination that the sent loop-probe packets do not return back to the first port, wherein blocked ports remain blocked when the loop-probe packets are observed to return back to the blocked ports.

12. The method of claim 1, wherein sending loop-probe packets by one or more network devices is through all ports.

13. The method of claim 12, wherein said all ports includes internal ports and external ports.

14. A method, comprising:
detecting, by a network device, a loop at a layer 2 of a network, wherein the network device is configured to execute a network device operation system (ndOS), wherein network devices executing ndOS share a global switch table;
blocking ports associated with the loop, wherein incoming packets received at the blocked ports are discarded except for loop-probe packets;
sending loop-probe packets by one or more network devices executing ndOS through the one or more ports of the network devices; and
unblocking a first port of the blocked ports based on the loop-probe packets when a lack of receipt of a loop-probe packet within a predetermined amount of time is detected for the first blocked port which indicates that the first blocked port is not part of the loop,
wherein an entry in the global switch table includes network device ID, MAC address, port ID, virtual LAN ID, migration history of the port, and flags;
wherein the migration history of the port includes one or more of port ID, owner ID, and time of migration;
wherein the flags include one or more of internal, host, and loop-probe.

15. A network device, comprising:
a plurality of external ports;
one or more internal ports; and
a control processor configured to execute a network device operation system (ndOS), wherein network devices executing ndOS share a global switch table, wherein the control processor is configured to detect a loop at a layer 2 of a network, wherein the control processor is configured to block external ports associated with the loop at the global switch table, wherein incoming packets received at the blocked external ports are discarded except for loop-probe packets;
wherein the control processor sends loop-probe packets through one or more ports of the network device to check status of the loop, wherein the control processor unblocks a first external port of the blocked external ports based on the loop-probe packets when a lack of receipt of a loop-probe packet within a predetermined amount of time is detected for the first blocked port which indicates that the first blocked external port is not part of the loop;
wherein the control processor detects the loop by tracking transitions between external ports for MAC addresses in the global switch table, wherein the control processor detects that a first MAC address has transitioned between a plurality of external ports at least a threshold number of times within a predetermined time period, and the control processor determines that external ports, from the plurality of external ports, that are associated with hosts are part of the loop.

16. The network device as recited in claim 15, wherein the control processor detects the loop by receiving a packet at a host-facing external port that is associated with a host in the global switch table and detecting that the packet has a source address of an internal port, wherein the internal port is a port inside of one of the network devices executing ndOS, wherein the global switch table includes an entry for the internal port, wherein the control processor determines that the host-facing external port is part of the loop.

17. The network device of claim 15, wherein the one or more internal ports are defined to be one or more of a physical port, or a virtual port.

18. The network device of claim 15, wherein the processor sends said loop-probe packets through all ports of the network device.

19. A network device, comprising:
a plurality of external ports;
one or more internal ports; and
a control processor configured to execute a network device operation system (ndOS), wherein network devices executing ndOS share a global switch table, wherein the control processor is configured to detect a loop at a layer 2 of a network, wherein the control processor is configured to block external ports associated with the loop at the global switch table, wherein incoming packets received at the blocked external ports are discarded except for loop-probe packets;
wherein the control processor sends loop-probe packets through one or more ports of the network device to check status of the loop, wherein the control processor unblocks a first external port of the blocked external ports based on the loop-probe packets when a lack of receipt of a loop-probe packet within a predetermined amount of time is detected for the first blocked port which indicates that the first blocked external port is not part of the loop;
wherein an entry in the global switch table includes network device ID, MAC address, port ID, virtual LAN ID, migration history of the port, and flags;
wherein the migration history of the port includes one or more of port ID, owner ID, and time of migration;
wherein the flags include one or more of internal, host, and loop-probe.

* * * * *